(12) United States Patent
Li et al.

(10) Patent No.: US 11,964,705 B1
(45) Date of Patent: Apr. 23, 2024

(54) EXPANDABLE AERODYNAMIC ENHANCEMENT APPARATUS FOR TRAILERS

(71) Applicant: Pebble Mobility, Inc., Sunnyvale, CA (US)

(72) Inventors: Aonan Li, Foster City, CA (US); Bingrui Yang, Los Altos, CA (US)

(73) Assignee: Pebble Mobility, Inc., Sunnyvale, CA (US)

( * ) Notice: Subject to any disclaimer, the term of this patent is extended or adjusted under 35 U.S.C. 154(b) by 0 days.

(21) Appl. No.: 18/243,605

(22) Filed: Sep. 7, 2023

(51) Int. Cl.
*B62D 35/00* (2006.01)

(52) U.S. Cl.
CPC .................................. *B62D 35/004* (2013.01)

(58) Field of Classification Search
None
See application file for complete search history.

(56) References Cited

U.S. PATENT DOCUMENTS

| | | | | |
|---|---|---|---|---|
| 5,050,927 | A * | 9/1991 | Montanari | B60P 3/32 296/176 |
| 5,833,296 | A * | 11/1998 | Schneider | B62D 33/08 296/175 |
| 6,135,539 | A * | 10/2000 | Bailey | B60P 3/341 296/26.11 |
| 6,561,570 | B2 * | 5/2003 | Gehman | B60P 3/34 296/171 |
| 7,104,591 | B1 * | 9/2006 | Sanns | B62D 35/001 296/180.1 |
| 9,604,564 | B1 * | 3/2017 | Pellicer | B60P 3/39 |

* cited by examiner

*Primary Examiner* — Joseph D. Pape
(74) *Attorney, Agent, or Firm* — Padowithz Alce; Quintin Scheitlin; Alce PLLC

(57) ABSTRACT

An electro-mechanical aerodynamic apparatus includes a support structure that couples to a tongue of a trailer in a position between a tow vehicle and a body of the trailer, an extendible housing that couples to the support structure and extendibly moves to a plurality of aerodynamic states including an extended state and a contracted state, and a drive assembly coupled to the support structure and the extendible housing that, when actuated, moves the extendible housing into one of the plurality of aerodynamic states.

19 Claims, 8 Drawing Sheets

Deployed State

Transparent View

Exterior View

Deployed State

Retracted State

Deployed State

Transparent View

Exterior View

Retracted State

Transparent View

Exterior View

Foldable Volumetric Shape(s)

Inflatable Volumetric Shape(s)

EXPANDABLE AERODYNAMIC ENHANCEMENT APPARATUS FOR TRAILERS

TECHNICAL FIELD

The inventions herein relate generally to the trailer towing field, and more specifically, to an expandable aerodynamic enhancement device for trailers.

BACKGROUND

In the realm of vehicle aerodynamics, particularly in the context of trailers and recreational vehicles (RVs), aerodynamic drag is a significant concern. Aerodynamic drag is a force that opposes an object's motion. High drag can decrease a range of a vehicle, reduce vehicle performance, and/or increase wear and tear on one or more components of the vehicle. Therefore, reducing aerodynamic drag is a key objective in the design of vehicles.

Presently, tow vehicles and trailers are optimized for their own independent driving performance. This leads to many inefficiencies in a towing system involving a tow vehicle and a trailer as neither the tow vehicle nor the trailer considers the towing setup as a whole. Specifically, one of the major sources of aerodynamic drag in a conventional towing system is the air gap between the tow vehicle and the trailer. The air gap creates a turbulent air region that not only increases aerodynamic drag of the towing system but can also negatively impact the stability of the tow vehicle and/or trailer.

Accordingly, there is a need for a new aerodynamic enhancement device that reduces overall aerodynamic drag of a towing system. The embodiments of the present application provide technical solutions that at least address the needs described above, as well as the deficiencies of the state of the art.

BRIEF SUMMARY OF THE INVENTION(S)

In some embodiments, an expandable aerodynamic enhancement apparatus incudes a support structure that couples to a tongue of a trailer in a position between a tow vehicle and a body of the trailer; an extendible housing that couples to the support structure and extendibly moves to a plurality of aerodynamic states including an extended state and a contracted state; and an actuatable component coupled to the extendible housing that, when actuated, moves the extendible housing into one of the plurality of aerodynamic states.

In some embodiments, the expandable aerodynamic enhancement apparatus further includes a control unit in operable communication with the actuatable component, wherein the control unit is configured to actuate the actuatable component to move the extendible housing to: (1) the extended state when one or more criteria are satisfied, and (2) the contracted state when the one or more criteria are not satisfied.

In some embodiments, the expandable aerodynamic enhancement apparatus is in operable communication with a sensor configured to measure a driving characteristic of the trailer, the actuatable component moves the extendible housing to the extended state when the driving characteristic satisfies the one or more criteria, and the actuatable component moves the extendible housing to the contracted state when the driving characteristic does not satisfy the one or more criteria.

In some embodiments, the position between the tow vehicle and the body of the trailer corresponds to a space between a rear portion of the tow vehicle and a front portion of the trailer that is a source of aerodynamic drag, the extendible housing, in the extended state, extends into at least a portion of the space and reduces the aerodynamic drag, and the extendible housing, in the contracted state, retracts to reveal a portion of the trailer obscured by the extendible housing in the extended state.

In some embodiments, the expandable aerodynamic enhancement apparatus includes a front portion and a back portion opposite the front portion, the front portion is spaced away from a rear of the tow vehicle, and the back portion is spaced away from the body of the trailer.

In some embodiments, moving, via the actuatable component, the extendible housing to the contracted state includes lowering the extendible housing over the support structure to minimize a total space or volume that the expandable aerodynamic enhancement apparatus occupies.

In some embodiments, during towing, a turbulent air region forms between the tow vehicle and the body of the trailer, and moving, via the actuatable component, the extendible housing to the extended state includes raising the extendible housing to physically occupy space within the turbulent air region.

In some embodiments, raising the extendible housing to the extended state pseudo-extends a total length of an upper portion of the body of the trailer by at least a minimum width of the extendible housing.

In some embodiments, raising the extendible housing includes substantially aligning a top surface contour of the expandable aerodynamic enhancement apparatus to be complimentary with a top surface contour of the body of the trailer.

In some embodiments, the top surface contour of the expandable aerodynamic enhancement apparatus artificially extends the top surface contour of the body of the trailer into the turbulent air region.

In some embodiments, a control unit in operable communication with the actuatable component is configured to receive user input signals specifying a target aerodynamic state for the extendible housing, and based on receiving the user input signals, the control unit actuates the actuatable component to move the extendible housing into the target aerodynamic state.

In some embodiments, the extendible housing encapsulates a majority of the support structure in the contracted state.

In some embodiments, encapsulating the majority of the support structure in the contracted state includes enclosing each distinct side of the support structure.

In some embodiments, the actuatable component is electrically coupled to a power unit.

In some embodiments, the actuatable component is configured to respond to physical actuation input from a user.

In some embodiments, a total height of the expandable aerodynamic enhancement apparatus in the extended state does not exceed a minimum height of the trailer.

In some embodiments, an interior of the support structure forms one or more storage compartments integrally connected to one or more interior surfaces of the support structure.

In some embodiments, an expandable aerodynamic enhancement apparatus includes a support structure that couples to a tongue of a trailer in a position between a tow vehicle and a body of the trailer; an extendible housing that couples to the support structure; and a drive assembly coupled to the extendible housing that, when actuated, moves the extendible housing into one of a plurality of aerodynamic states.

In some embodiments, the expandable aerodynamic apparatus further includes a control unit in operable communication with the drive assembly, wherein the control unit is configured to actuate the drive assembly for moving the extendible housing to: (1) the extended state when one or more driving criteria are satisfied, and (2) the contracted state when the one or more driving criteria are not satisfied.

In some embodiments, the position between the tow vehicle and the body of the trailer corresponds to a space between a rear portion of the tow vehicle and a front portion of the trailer that is a source of aerodynamic drag, the extendible housing, in the extended state, extends into at least a portion of the space to reduce the aerodynamic drag, and the extendible housing, in the contracted state, retracts to reveal a portion of the trailer obscured by the extendible housing in the extended state.

In some embodiments, a total height of the electro-mechanical aerodynamic apparatus in the extended state does not exceed a minimum height of the trailer.

In some embodiments, an electro-mechanical aerodynamic includes a support structure that couples to a tongue of a trailer in a position between a tow vehicle and a body of the trailer, an extendible housing that couples to the support structure and extendibly moves to a plurality of aerodynamic states including an extended state and a contracted state, a drive assembly coupled to the support structure and the extendible housing that, when actuated, moves the extendible housing into one of the plurality of aerodynamic states, a sensor configured to detect a speed of the trailer, and a control unit in operable communication with the sensor and the drive assembly, wherein the control unit is configured to actuate the drive assembly to move the extendible housing to: the extended state when the sensor detects that the speed of the trailer exceeds a trailer speed threshold, and the contracted state when the sensor detects that the speed of the trailer falls below the trailer speed threshold.

In some embodiments, when the sensor detects that the speed of the trailer falls below the trailer speed threshold, actuating the drive assembly includes lowering the extendible housing over the support structure to minimize a total space that the electro-mechanical aerodynamic apparatus occupies.

In some embodiments, the extendible housing encapsulates a majority of the support structure in the contracted state.

In some embodiments, encapsulating the majority of the support structure in the contracted state includes enclosing each distinct side of the support structure.

In some embodiments, during towing, a turbulent air region forms between the tow vehicle and the body of the trailer, and when the sensor detects that the speed of the trailer increases above the trailer speed threshold, actuating the drive assembly includes raising the extendible housing to physically occupy space within the turbulent air region.

In some embodiments, raising the extendible housing to the extended state pseudo-extends a total length of an upper portion of the body of the trailer by at least a minimum width of the extendible housing.

In some embodiments, raising the extendible housing includes substantially aligning a top surface contour of the electro-mechanical aerodynamic apparatus with a top surface contour of the body of the trailer.

In some embodiments, the top surface contour of the electro-mechanical aerodynamic apparatus artificially extends the top surface contour of the body of the trailer into the turbulent air region.

In some embodiments, the drive assembly is electrically connected to one or more power-generating components of the trailer.

In some embodiments, the trailer is an autonomous electric-powered (AEP) trailer, and the one or more power-generating components of the trailer comprise one or more electric motors.

In some embodiments, the control unit is further configured to receive user input signals specifying a target aerodynamic state of the extendible housing, and based on receiving the user input signals, the control unit actuates the drive assembly to move the extendible housing into the target aerodynamic state.

In some embodiments, the position between the tow vehicle and the body of the trailer corresponds to a space between a rear portion of the tow vehicle and a front portion of the trailer that is a source of aerodynamic drag, the extendible housing, in the extended state, occupies at least a portion of the space to reduce the aerodynamic drag, and the extendible housing, in the contracted state, retracts to reveal a portion of the trailer obscured by the extendible housing in the extended state.

In some embodiments, the portion of the trailer revealed when the extendible housing is in the contracted state includes one or more windows of the trailer.

In some embodiments, a total height of the electro-mechanical aerodynamic apparatus in the extended state does not exceed a minimum height of the trailer.

In some embodiments, the electro-mechanical aerodynamic apparatus further includes a storage compartment integrated within the support structure, the storage compartment configured to store one or more items during transit.

In some embodiments, the electro-mechanical aerodynamic apparatus includes a front portion and a back portion opposite of the front portion, the front portion spaced away from a rear of the tow vehicle, and the back portion spaced away from the body of the trailer.

In some embodiments, an electro-mechanical aerodynamic apparatus includes a support structure that couples to a tongue of a trailer in a position between a tow vehicle and a body of the trailer, an extendible housing that couples to the support structure and extendibly moves to a plurality of aerodynamic states including an extended state and a contracted state, and a drive assembly coupled to the support structure and the extendible housing that, when actuated, moves the extendible housing into one of the plurality of aerodynamic states.

In some embodiments, the electro-mechanical aerodynamic apparatus according further includes a control unit in operable communication with the drive assembly, wherein the control unit is configured to actuate the drive assembly to move the extendible housing to: (1) the extended state when a speed of the trailer exceeds a trailer speed threshold, and (2) the contracted state when the speed of the trailer falls below the trailer speed threshold.

In some embodiments, the position between the tow vehicle and the body of the trailer corresponds to a space between a rear portion of the tow vehicle and a front portion of the trailer that is a source of aerodynamic drag, the extendible housing, in the extended state, extends into at least a portion of the space to reduce the aerodynamic drag, and the extendible housing, in the contracted state, retracts to reveal a portion of the trailer obscured by the extendible housing in the extended state.

In some embodiments, a total height of the electromechanical aerodynamic apparatus in the extended state does not exceed a minimum height of the trailer.

DESCRIPTION OF THE PREFERRED EMBODIMENTS

The following description of the preferred embodiments of the invention(s) is not intended to limit the invention(s) to these preferred embodiments, but rather to enable any person skilled in the art to make and use the invention(s).

1. System for Aerodynamic Towing

Figure 1:
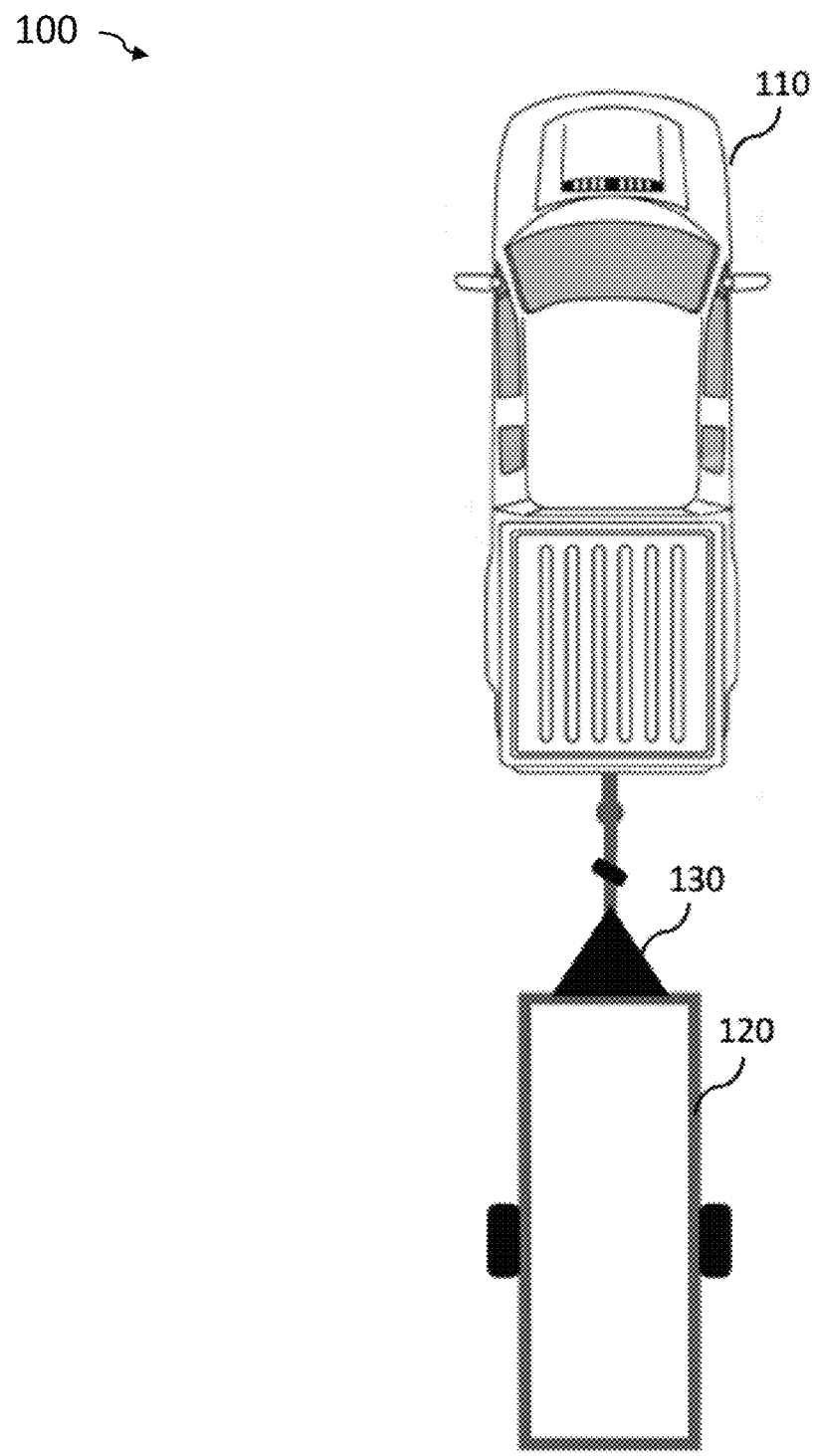
FIG. 1 illustrates a schematic representation of a system 100 in accordance with one or more embodiments of the present application.

As shown in FIG. 1, a system 100 for reducing aerodynamic drag during towing may include a tow vehicle 110, a trailer 120, and an aerodynamic enhancement apparatus 130 positioned between the tow vehicle 110 and the trailer 120. As will be described in more detail herein, the system 100 may mitigate or reduce sources of drag in a towing setup. For instance, in a non-limiting example, the system 100 may reduce aerodynamic drag caused by a spatial gap between the tow vehicle 110 and the trailer 120. Various non-limiting embodiments of the tow vehicle 110, the trailer 120, and the aerodynamic enhancement apparatus 130 will now be described.

1.10 Tow Vehicle

In some embodiments, the tow vehicle 110 may refer to a vehicle responsible for towing the trailer 120, such as a truck, sport utility vehicle (SUV), or the like. The tow vehicle 110, in some embodiments, may be controlled or operated by a human driver. For instance, in a non-limiting example, steering operations, acceleration operations, and/or braking operations of the tow vehicle 11 may be controlled by the human driver.

Additionally, or alternatively, in some embodiments, the tow vehicle 110 may include autonomous or semi-autonomous driving capabilities. The autonomous or semi-autonomous driving capabilities, in some embodiments, may assist the human driver in operating the tow vehicle 110 and enhance the safety or operational efficiency of the tow vehicle 11.

1.20 Trailer

In some embodiments, the trailer 120 may trail behind and be towed by the tow vehicle 11. The trailer 120 may represent various types of trailers. For instance, in some embodiments, the trailer 120 may be a utility trailer that is designed for transporting goods or equipment. In another example, the trailer 120 may be a travel trailer (e.g., RV) or caravan equipped with living facilities for use during travel or camping. In yet another example, the trailer 120 may be a vehicle trailer designed for hauling cars, motorcycles, or the like.

Additionally, or alternatively, in some embodiments, the trailer 120 may be a trailer with capabilities of autonomously assisting the tow vehicle 110 during towing. For instance, in some embodiments, the trailer 120 may include autonomous capabilities that actively propel, brake, or steer the trailer 120. Such autonomous capabilities may be advantageous for a plurality of reasons including, but not limited to, offsetting energy loss of the tow vehicle 110, extending a driving range of the tow vehicle 110, and/or the like.

In some embodiments, a trailer having such autonomous capabilities may comprise a chassis, a plurality of wheels, a steerable axle, one or more electric motors, a battery system, one or more sensing devices, an autonomous control system, and/or a communication interface system. Various embodiments of such components are described in more detail in U.S. patent application Ser. No. 18/128,633 titled "SYSTEMS AND METHODS FOR TETHERING AN AUTONOMOUS ELECTRIC-POWERED TRAILER TO A TOWING NEXUS," which is incorporated in its entirety by this reference.

1.30 Aerodynamic Enhancement Apparatus

As will be described in more detail with reference to FIGS. 2-9, in some embodiments, the aerodynamic enhancement apparatus 130 may be configured to reduce aerodynamic drag caused by a turbulent air region existing between the tow vehicle 110 and the trailer 120. Specifically, in some embodiments, the aerodynamic enhancement apparatus 130 may mitigate or reduce an effect of the turbulent air region by occupying or filling the space between the tow vehicle 110 and the trailer 120.

Furthermore, in some embodiments, the aerodynamic enhancement apparatus 130 may operate in a plurality of modes, including an expanded mode (commonly referred to as "transit mode," "deployed mode," "extended state," or the like) and a collapsed mode (commonly referred to as "camping mode," "retracted mode," "contracted state," or the like). In the expanded mode, the aerodynamic enhancement apparatus 130 may expand or extend to reduce aerodynamic drag during towing. Conversely, in the collapsed mode, the aerodynamic enhancement apparatus 130 may collapse or retract, potentially revealing features of the trailer 120 such as one or more viewing ports (e.g., windows), storage areas, or the like. It shall be noted that, in some embodiments, a design of the trailer 120 may dictate the specific features or elements that are revealed or concealed in either mode, and the transition between these modes can be manually controlled or automatically triggered based on various factors such as speed, stability requirements, user preferences, other operational considerations, or it may occur without a specific driving reason. Preferably, in one or more embodiments, the expanded mode may be used when the trailer 120 is in motion (e.g., transit), and the collapsed mode may be used when the trailer 120 is stationary.

Figure 4:
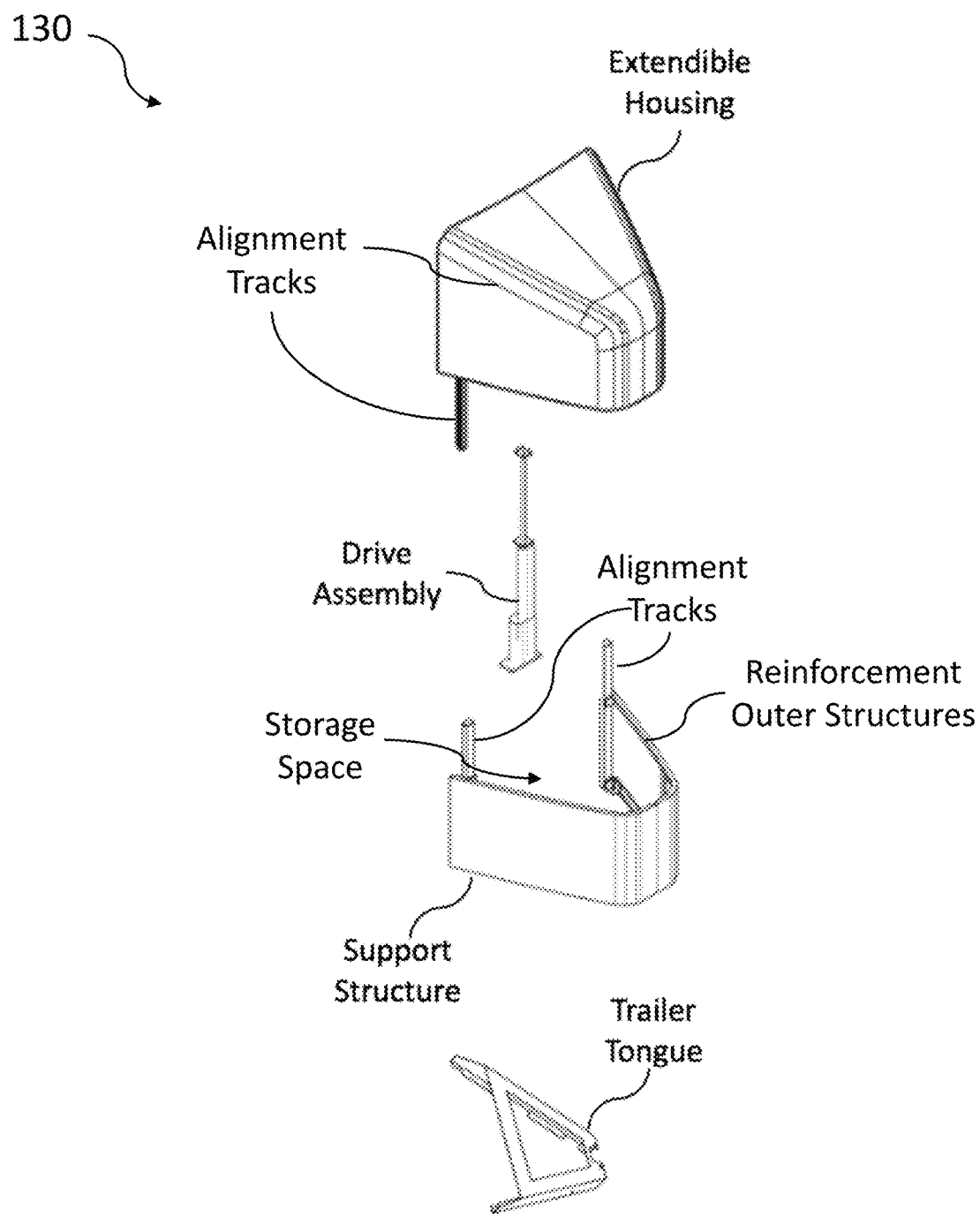
FIG. 4 illustrates an example exploded view of the aerodynamic enhancement apparatus in accordance with one or more embodiments of the present application.
Figure 5:
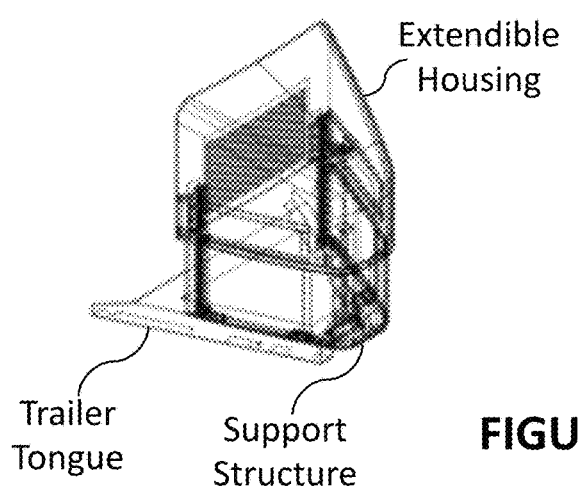
FIGS. 5-9 illustrate various views and states of the aerodynamic enhancement apparatus in accordance with one or more embodiments of the present application.
Figure 5:
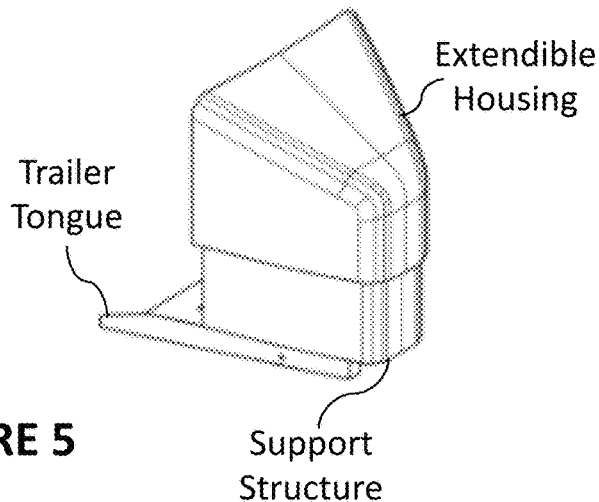
Figure 6:
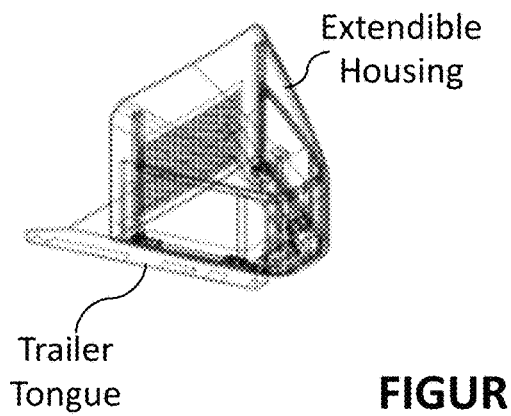
Figure 6:
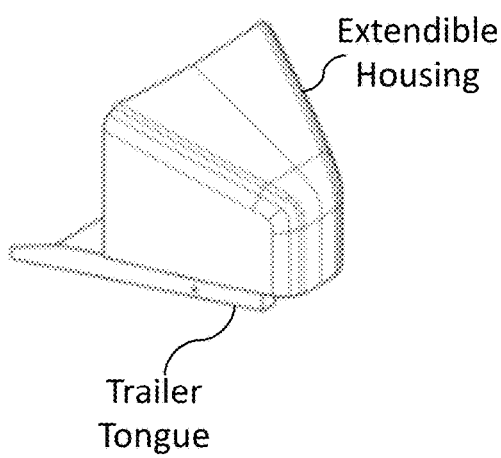

Furthermore, in some embodiments and as illustrated in FIG. 4, the aerodynamic enhancement apparatus 130 may form additional storage space for the trailer 120. This may be advantageous for many reasons including, but not limited, for long journeys or trips where extra storage is typically needed. The additional storage space, in some embodiments, may be accessed via a secure door located at a respective side of the aerodynamic enhancement apparatus 130 and/or may include compartments for organizing items. Stated differently, in some embodiments, an interior of the aerodynamic enhancement apparatus 130 (e.g., a support structure or base) may form one or more storage compartments (e.g., shelves, drawers, cubbies, bins, etc.) that integrally connect to one or more interior surfaces of the support structure.

2. Embodiments of the Aerodynamic Enhancement Apparatus

Figure 2:
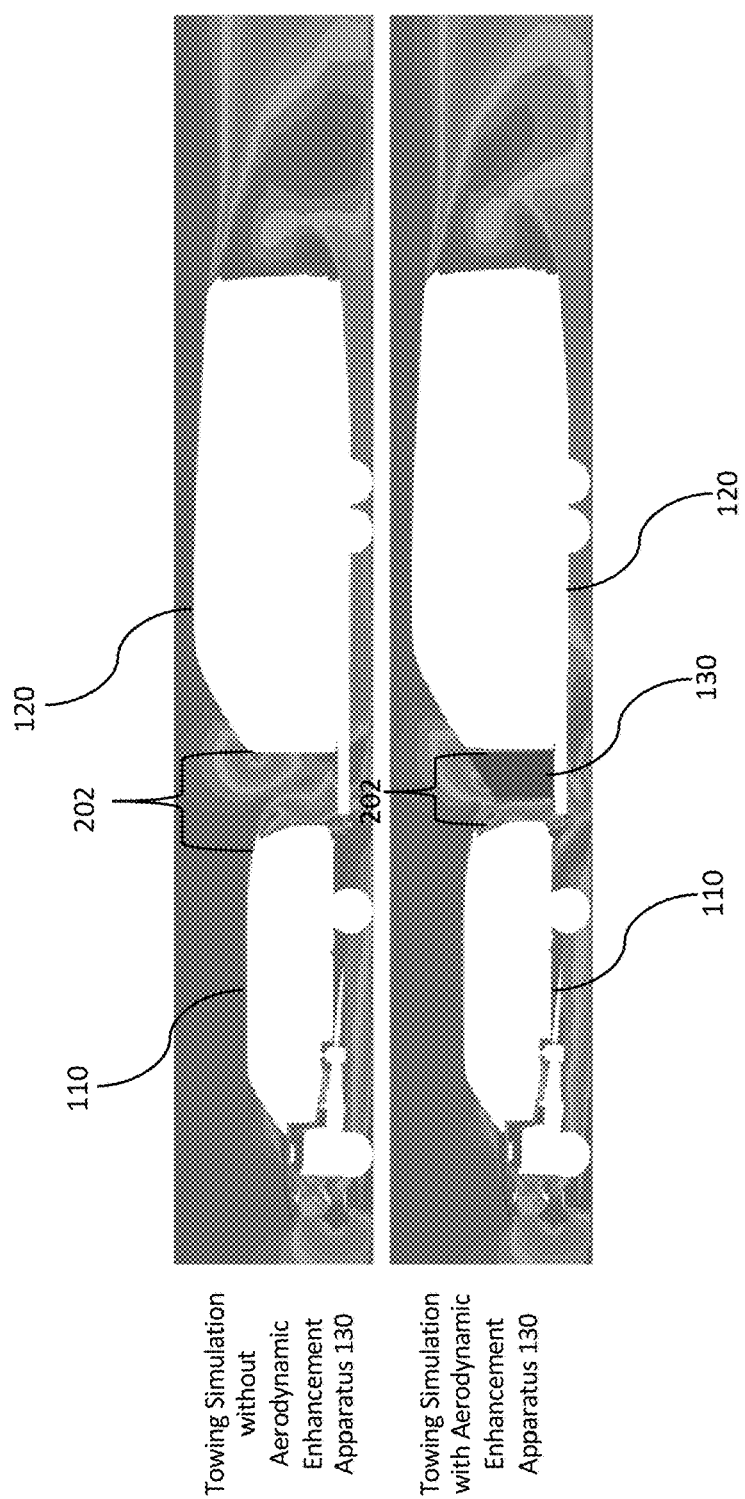
FIG. 2 illustrates Computational Fluid Dynamics (CFD) simulations of towing with and without an aerodynamic enhancement apparatus in accordance with one or more embodiments of the present application.
Figure 3:
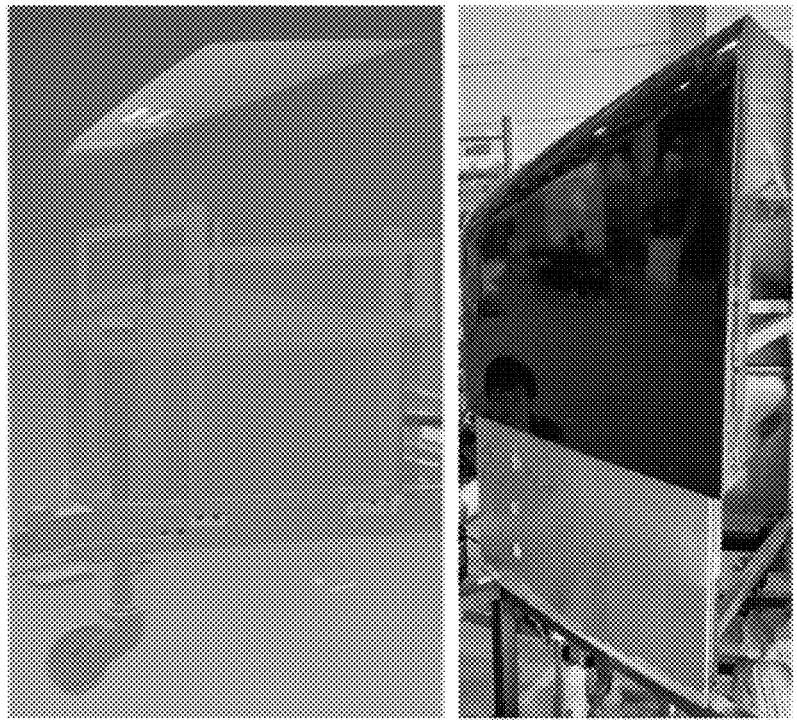
FIG. 3 illustrates an example of an aerodynamic enhancement apparatus in a deployed state and a retracted state in accordance with one or more embodiments of the present application.
Figure 3:
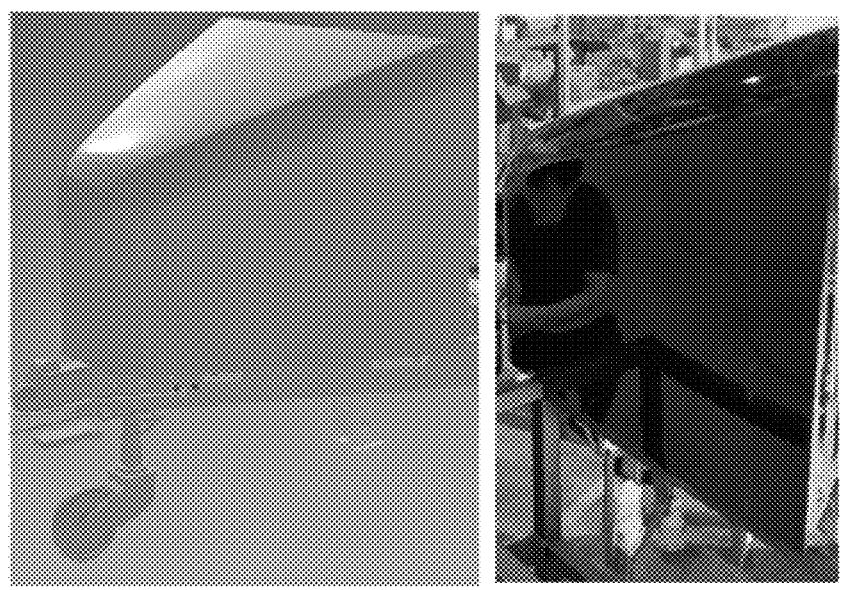

FIG. 2 illustrates an aerodynamic enhancement apparatus 130 in accordance with some embodiments of the disclosure. As will be described in more detail herein, in some embodiments, the aerodynamic enhancement apparatus 130 may occupy or reside in at least a portion of a space that typically includes turbulent air and, in turn, may reduce aerodynamic drag caused by such turbulent air. It shall be noted that, in some portions of the disclosure, a space that includes turbulent air may be referred to as "a turbulent air region" (or similar recitations). It shall also be noted that, in some portions of the disclosure, the aerodynamic enhancement apparatus 130 may be interchangeably referred to herein as a "transformable aerodynamic enhancement apparatus," an "aerodynamic box," an "aero box," a "transformable aero box," or the like.

Occupying or Filling a Turbulent Air Region

In some embodiments, as generally illustrated in FIG. 2, the aerodynamic enhancement apparatus 130 may occupy or fill a turbulent air region 202 existing between a tow vehicle 110 and a trailer 120. The turbulent air region 202, as generally referred to herein, may refer to an area of disturbed air flow that is created due to a spatial gap existing between the tow vehicle 110 and the trailer 120. This disturbed air (e.g., turbulence), in some embodiments, may lead to an increase in aerodynamic drag, which can negatively impact range efficiency, vehicle performance, and stability of the tow vehicle 110 or the trailer 120.

In some embodiments, the spatial gap causing the turbulent air region 202 may refer to or comprise areas proximal to a tethering nexus of the tow vehicle 110 and a front portion of the trailer 120. The tethering nexus of the tow vehicle 110, as referred to herein, may relate to a mechanism, device, and/or system with which a hitch coupling component of the trailer 120 may establish an effective towing connection. In some embodiments, such mechanism, device, and/or system may preferably be attached to a chassis or body of a towing entity (e.g., a vehicle). Thus, in a non-limiting example, the tethering nexus of the tow vehicle 110 may include, but should not be limited to, a tow hitch, a tow hitch ball, a tow hitch receiver, a tow bar, a trailer hitch, a tow pin, a tow loop, a towing pintle, and/or the like.

Furthermore, in some embodiments, the front portion of the trailer 120 may comprise a trailer tongue or the like that extends from a main body of the trailer 120. The trailer tongue, in some embodiments, may be of any suitable structure including (but not limited to) an A-frame structure and/or may comprise any suitable material(s) such as metal materials, metal-derived materials, wood materials, wood-based materials, and/or the like. Additionally, or alternatively, in some embodiments, the trailer tongue may include a hitch coupling component that enables a physical towing connection between the tethering nexus of the tow vehicle 110 and the trailer 120.

Secure Attachment Mechanism

In some embodiments, the aerodynamic enhancement apparatus 130 may couple to the tongue of the trailer 120 (e.g., A-frame) via a secure attachment mechanism. The secure attachment mechanism, in some embodiments, may enable the aerodynamic enhancement apparatus 130 to withstand wind and vibration at high speeds and/or may enable the aerodynamic enhancement apparatus 130 to remain securely attached to the trailer 120 during towing or transit. Furthermore, in some embodiments, the secure attachment mechanism may enable the aerodynamic enhancement apparatus 130 to detach from the trailer 120 when not in use.

In some embodiments, the aerodynamic enhancement apparatus 130 may form a plurality of voids (e.g., holes) to support a mounting of the aerodynamic enhancement apparatus 130 to the tongue of the trailer 120. The plurality of voids may be formed on any portion or region of the aerodynamic enhancement apparatus 130 including, but not limited to, one or more sides of the aerodynamic enhancement apparatus 130, a top surface of the of the aerodynamic enhancement apparatus 130, a bottom surface of the aerodynamic enhancement apparatus 130, or the like. It shall be noted that, in some portions of the disclosure, a surface that includes one or more voids may be referred to as a "mounting surface" (or similar recitations).

It shall also be noted that, in some embodiments, the terms "left," "right," "front," "back," "top," "side," "bottom," "over," "under," and the like are used only for descriptive purposes and not necessarily for describing permanent relative positions. It is to be understood that the terms so used are interchangeable under appropriate circumstances such that the embodiments of the apparatus are, for example, capable of operation in other orientations than those illustrated or otherwise described herein.

In some embodiments, the plurality of voids formed on the aerodynamic enhancement apparatus 130 may enable a coupling of the aerodynamic enhancement apparatus 130 to the trailer 120. For instance, in a non-limiting example, the plurality of voids may have a geometry (e.g., size or dimension) that enables the aerodynamic apparatus 130 to couple to the trailer 120 using any suitable type of fastener including, but not limited to, rivets, screws, bolts, clamps, and/or the like. It shall be noted that the term "coupling" used herein can be defined as connecting two or more elements, mechanically or otherwise. Furthermore, coupling may be for any length of time (e.g., permanent, semi-permanent, or only for an instant) and the absence of the word "removable" near the word "coupled" (or the like) does not mean that the coupling in question is or is not removable.

In some embodiments, the aerodynamic enhancement apparatus 130 may couple to one or more mounting fixtures attached to the tongue of the trailer 120 (e.g., bracketry). The one or more mounting fixtures, in some embodiments, may be attached to one or more arms of the A-frame structure (or the like). Additionally, or alternatively, in some embodiments, the one or more mounting fixtures may include one or more threads for receiving and engaging with the suitable fastener. Example mounting fixtures that may be attached to the trailer 120 may include, but should not be limited to, L-brackets, Z-brackets, U-brackets, offset brackets, gusset brackets, and/or the like.

It shall be noted that, in some embodiments, once mounted or coupled to the trailer 120, a front portion of the aerodynamic enhancement apparatus 130 may be spaced away from a rear of the tow vehicle 110 and a back portion of the aerodynamic enhancement apparatus 130—opposite to the front portion of the of the aerodynamic enhancement apparatus 130—may be spaced away from a front portion of the body of trailer 120.

Geometry of the Aerodynamic Enhancement Apparatus

In some embodiments, the aerodynamic enhancement apparatus 130 may have a trapezoidal-like shape that extends from a back-portion of the tongue of the trailer 120 to a front-portion of the tongue of the trailer 120. It shall be noted that the above-described embodiment is not intended to be limiting and that, in other embodiments, the aerodynamic enhancement apparatus 130 may have a different geometric shape than illustrated in FIGS. 1-3. For instance, in a non-limiting example, the aerodynamic enhancement apparatus 130 may have a rectangular-like shape, a square-like shape, a box-like shape, a triangular-like shape, a conical-like shape, or the like.

In some embodiments, the aerodynamic enhancement apparatus 130 may lie (e.g., rest) on a top portion of the tongue of the trailer 120 and/or may have a length that causes the aerodynamic enhancement apparatus 130 to extend over a pre-determined amount of the tongue of the trailer. The length of the aerodynamic enhancement apparatus 130, in some embodiments, may be pre-determined (e.g., fixed) or adjustable for optimal driving maneuverability and/or aerodynamics. For instance, in a non-limiting example, the length of aerodynamic enhancement apparatus 130 may be extendable for high-speed highway driving to minimize drag and retractable for city driving to improve maneuverability of the tow vehicle 110.

Alternativity, in some embodiments, the aerodynamic enhancement apparatus 130 may have a pre-determined (e.g., fixed) length. The pre-determined length of the aerodynamic enhancement apparatus 130, in some embodiments, may cause the aerodynamic enhancement apparatus to extend over a pre-determined amount of the tongue of the trailer 120 (e.g., 10%, 15%, 30%, 40%, 50%, 70%, 80%, 95%, etc.). In general, the amount of aerodynamic drag reduction achieved by the aerodynamic enhancement apparatus 130 may, in part, be a function of the length of the aerodynamic enhancement apparatus 130. For instance, as the length of the aerodynamic enhancement apparatus 130 increases, the amount of aerodynamic drag experienced by the trailer 120 and the tow vehicle 110 may correspondingly (e.g., proportionally) decrease. Accordingly, in one or more embodiments, the length of the aerodynamic enhancement apparatus 130 may be optimized to reduce a maximum or target amount of drag without impeding maneuverability of the tow vehicle 11.

In some embodiments, the aerodynamic enhancement apparatus 130 may include an upper portion (e.g., top portion) and a lower portion (e.g., bottom portion). The upper and/or lower portion, in one or more embodiments, may be made of fiberglass due to its lightweight and strong properties. However, in other embodiments, the upper and/or lower portion may be made of different materials without departing from the scope of the disclosure contemplated herein. For instance, in another non-limiting example, the upper and/or lower portion of the aerodynamic enhancement apparatus 130 may be made of carbon fiber, plastic, etc. Such materials may be selected according to various requirements and criteria, including (but not limited to) weight criteria, material strength criteria, cost criteria, resistance to environmental conditions criteria (e.g., corrosion, UV radiation), and/or the like.

It shall be noted that, while some portions of the disclosure describe the aerodynamic enhancement apparatus 130 as including two portions (e.g., an upper and lower portion), it is not a strict requirement of the aerodynamic enhancement apparatus 130. In fact, in some embodiments, the aerodynamic enhancement apparatus 130 may be designed with fewer, more, or different portions than described without departing from the scope of the disclosure described herein. For instance, in a non-limiting example, the aerodynamic enhancement apparatus 130 may include an intermediate portion (e.g., intermediate section) between the upper and lower portions. This intermediate portion, in some embodiments, may house additional components such as sensors, control units, or supplementary aerodynamic features.

In some embodiments, the lower portion (e.g., also referred to as a "support structure") of the aerodynamic enhancement apparatus 130 may be stationary and serve as a base for the upper portion of the aerodynamic enhancement apparatus 130. For instance, in a non-limiting example, the lower portion of the aerodynamic enhancement apparatus 130 may be internally reinforced to provide stability and support to the upper portion of the aerodynamic enhancement apparatus 130.

Furthermore, in some embodiments, the lower portion of the aerodynamic enhancement apparatus 130 may have a different size than the upper portion of the aerodynamic enhancement apparatus 130. In one implementation, the lower portion of the aerodynamic enhancement apparatus 130 may have a smaller size than the upper portion of the aerodynamic enhancement apparatus 130. This smaller size, as generally illustrated in FIGS. 3-6, may enable the upper portion of the aerodynamic enhancement apparatus 130 to clear (e.g., slide over) the lower portion of the aerodynamic enhancement apparatus 130—which may be particularly beneficial for enabling a collapsibility of the aerodynamic enhancement apparatus 130 (as described in more detail herein).

Alternatively, in a second implementation, the lower portion of the aerodynamic enhancement apparatus 130 may have a larger size than the upper portion of the aerodynamic enhancement apparatus 130. This larger size may enable the lower portion of the aerodynamic enhancement apparatus 130 to accommodate (e.g., encase or envelop) the upper portion of the aerodynamic enhancement apparatus 130—which may be particularly beneficial for enabling a collapsibility of the aerodynamic enhancement apparatus 130 (as described in more detail herein).

It shall be noted that other geometric characteristics of the aerodynamic enhancement apparatus 130, such as a height of the aerodynamic enhancement apparatus 130, will be described in more detail below with reference to operating modes of the aerodynamic enhancement apparatus 130. However, in general, the larger the space that the aerodynamic enhancement apparatus 130 occupies, the greater its potential for enhancing efficiencies. That is, in some embodiments, the size of the aerodynamic enhancement apparatus 130 (e.g., width, height, depth, etc.) and the aerodynamics of the tow vehicle 110 all contribute to the effectiveness of the aerodynamic enhancement apparatus 130. However, it shall also be noted that, in some embodiments, if the height of the aerodynamic enhancement apparatus 130 exceeds a height of the trailer 120, there can be diminishing efficiencies. This may be due to the fact that when the aerodynamic enhancement apparatus 130 extends beyond a profile of the trailer 120, it may disrupt the airflow and reduce its effectiveness in improving overall aerodynamic performance.

Furthermore, it shall also be noted that the geometric characteristics of the aerodynamic enhancement apparatus 130 may be specifically selected to reduce an amount of air and pressure on the frontal area of the trailer 120. Specifically, in some embodiments, the geometric characteristics of the aerodynamic enhancement apparatus 130 cause turbulent air to be directed upwards and towards the sides of the trailer 120, effectively creating a pseudo nose cone.

Operating Modes

In some embodiments, the aerodynamic enhancement apparatus 130 may operate in a plurality of modes, including an expanded mode ("transmit mode") and a collapsed mode ("camping mode"). Transforming the aerodynamic enhancement apparatus 130 to the collapsed mode may be advantageous in a plurality of scenarios, including (but not limited to) when the trailer 120 is stationary or not in motion. Specifically, in the collapsed mode, one or more portions of the aerodynamic enhancement apparatus 130 may be lowered. This action could potentially reveal features of the trailer 120 such as viewing ports (e.g., windows), storage areas, or other elements. However, it's worth noting that this is a potential technical benefit of the collapsed mode and not a strict or mandatory outcome of the transition to the collapsed mode. In some instances, the transition to the collapsed mode may not reveal any additional features of the trailer 120 at all.

Analogously, in some embodiments, transforming the aerodynamic enhancement apparatus 130 to the expanded mode may also be advantageous in a plurality of scenarios including (but not limited to) when the trailer 120 is in motion or transit. Specifically, in the expanded mode, one or more portions of the aerodynamic enhancement apparatus 130 may be laterally and/or vertically extended for reducing drag experienced during a towing of the trailer 120 (e.g., extend in one or more of a leftward direction, a rightward direction, an upward direction, a bottomward direction, and/or any other direction(s) away from a target mounting surface). Thus, in some embodiments, such mode may enable the aerodynamic enhancement apparatus 130 to provide maximum aerodynamic support to the trailer 120 and the tow vehicle 110. Various non-limiting examples of transforming the aerodynamic enhancement apparatus 130 to the expanded mode and the collapsed mode will now be described.

In some embodiments, the aerodynamic enhancement apparatus 130 may include a driving mechanism (e.g., a manually powered or user-operated drive assembly) that enables the aerodynamic enhancement apparatus 130 to transform from the expanded mode to the collapsed mode (or vice versa). The driving mechanism, in some embodiments, may interface with the upper portion (e.g., also referred to as a "extendible housing") of the aerodynamic enhancement apparatus 130 for raising or lowering the upper portion of the aerodynamic enhancement apparatus 130. For instance, in a non-limiting example, the driving mechanism may include a sliding mechanism (e.g., one or more hydraulic pistons and/or pneumatic pistons), a rotational mechanism (e.g., one or more worm gears), or a four-bar linkage mechanism that operates to raise or lower the upper portion of the aerodynamic enhancement apparatus 130.

In some embodiments, the driving mechanism may interface with the upper portion of the aerodynamic enhancement apparatus 130 via guide rails or linear tracks. Specifically, in some embodiments, the guide rails may couple (e.g., connect) to the upper portion of the aerodynamic enhancement apparatus 130 and/or may enable the upper portion of the aerodynamic enhancement apparatus 130 to slidably move within such guide rails. It shall be noted that, in some embodiments, moving the upper portion of the aerodynamic enhancement apparatus to various positions within the guide rails may be advantageous for many reasons including, but not limited to, preventing unintended contact with the trailer 120, maintaining parallel orientation with the trailer 120, and/or the like.

It shall be noted that, in some instances, the driving mechanism may be powered by a motor electrically coupled to the aerodynamic enhancement apparatus 130. This motor, which can be of any suitable type (e.g., DC motor, stepper motor, servo motor, or the like), may provide the mechanical force to actuate the extendible housing between its various aerodynamic states. In some embodiments, operations of the motor may be controlled to adjust the position of the extendible housing, allowing it to move between an extended state for improved aerodynamics during towing and a contracted state for reduced size (e.g., when the trailer is stationary). The speed, direction, and/or toque of the motor, in some embodiments, may be controlled based on inputs from sensors, a control unit, or the like. It shall be noted that controlling the motor based on inputs from sensors, a control unit, or the like may have several technical advantages including enabling the aerodynamic state of the aerodynamic enhancement apparatus 130 to be dynamically adjusted based on factors such as speed of the trailer, wind conditions, user preferences, or the like.

In some embodiments, the aerodynamic enhancement apparatus 130 may be configured to deploy automatically when the trailer 120 is being towed above a predefined threshold speed for a target amount of time. For instance, in a non-limiting example, the aerodynamic enhancement apparatus 130 may automatically transition from a retracted state to a deployed state when the system 100 (e.g., a sensor of the system 100 implemented on the tow vehicle 110, the aerodynamic enhancement apparatus 130, or the trailer 120) determines that the trailer 120 has been operating at a speed of 10 miles per hour (mph) for at least the target amount of time. Additionally, or alternatively, in some embodiments, the aerodynamic enhancement apparatus 130 may be configured to manually deploy or retract based on user input or interaction. Thus, in such embodiments, the aerodynamic enhancement apparatus 130 may remain at a specified state until next user input is received.

In some embodiments, when transforming the aerodynamic enhancement apparatus 130 from the collapsed mode to the expanded mode, the driving mechanism may raise the upper portion of the aerodynamic enhancement apparatus 130 to align with a top edge (e.g., forward edge) of the trailer 120. For instance, as generally shown in FIG. 2, in the expanded mode, the top edge of the aerodynamic enhancement apparatus 130 may compliment, match or be substantially similar to a curvature of the top edge of the trailer 120. It shall be noted that such relationship may especially be advantageous for optimizing aerodynamic efficiencies of the trailer 120 and for maintaining a complimentary appearance with the trailer 120. Stated another way, in some embodiments, the top edge of the aerodynamic enhancement apparatus 130 may "pseudo" extend the top edge of the trailer 120.

In some embodiments, when transforming the aerodynamic enhancement apparatus 130 from the expanded mode to the collapsed mode, the driving mechanism may lower the upper portion of the aerodynamic enhancement apparatus 130 to partially enclose or fully enclose a majority of the lower portion of the aerodynamic enhancement apparatus 130 (e.g., 50%, 60%, 70%, 80%, 90%, 100% of the lower portion). Thus, in the collapsed mode, the aerodynamic enhancement apparatus 130 may have a smaller or reduced profile as compared to the expanded mode and/or may reveal a top portion (e.g., top half or the like) of a wall of the trailer 120. Such configuration may be particularly advantageous for a plurality of reasons including, but not limited to, preserving window views for occupants of the trailer 120. Stated another way, in the collapsed mode, the upper portion of the aerodynamic enhancement apparatus 130 may fit neatly over the lower portion for creating a compact and streamlined shape.

It shall be noted that, in some embodiments, the actuation of the driving mechanism may be governed by a control unit. The control unit, in some embodiments, may be in operable communication with the driving mechanism, enabling it to control operations of the driving mechanism. Additionally, in some embodiments, the control unit may also be linked to a sensor that detects the speed of the trailer. Based on the speed data received from the sensor, the control unit may be programmed to actuate the driving mechanism to move the extendible housing into a plurality of aerodynamic states.

For instance, in a non-limiting example, if the sensor detects that the speed of the trailer exceeds a predetermined speed threshold, the control unit may actuate the driving mechanism to move the extendible housing into an extended state. Conversely, if the sensor detects that the speed of the trailer falls below the speed threshold, the control unit may actuate the driving mechanism to move the extendible housing into a contracted state. Additionally, or alternatively, in another example, the control unit may be configured to receive user input signals specifying a target aerodynamic state of the extendible housing. Accordingly, based on receiving these user input signals, the control unit may actuate the drive assembly to move the extendible housing into the target aerodynamic state.

Foldable Aerodynamic Enhancement Apparatus

Figure 7:
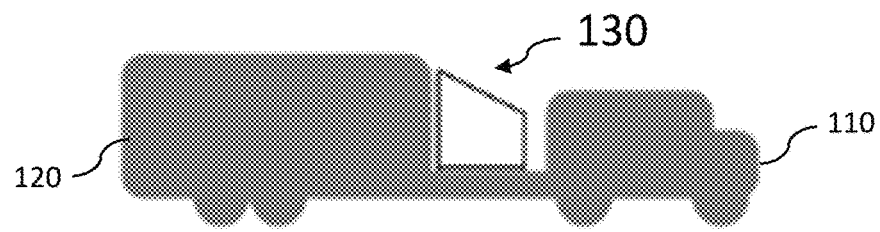
Figure 7:
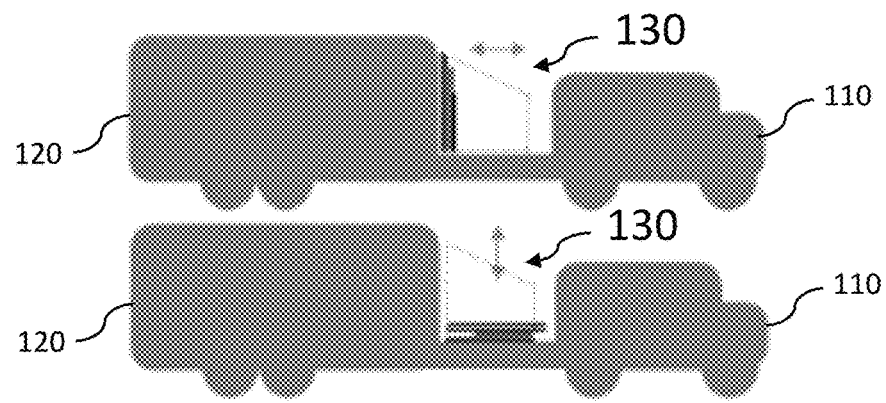

In some embodiments, the aerodynamic enhancement apparatus 130 may have a structure that enables the aerodynamic enhancement apparatus 130 to expand and/or collapse in a foldable manner, as shown by way of example in FIG. 7. In these embodiments, the aerodynamic enhancement apparatus 130 may be composed of a series of one or more interconnected panels or sections that can fold in on themselves when the apparatus is in its contracted state, and unfold to form a larger, more aerodynamic shape when in its extended state. It shall be noted that these embodiments may be advantageous for numerous reasons including allowing for a more compact contracted state, as well as a more diverse range of shapes in the extended state, potentially offering improved aerodynamic performance.

In some embodiments, the one or more interconnected panels may be made from a lightweight, sturdy material, such as reinforced plastic or thin metal, allowing such interconnected panels to maintain their shape under high wind pressures while still being light enough to not significantly add to the weight of the trailer 120. The folding and unfolding mechanism, in some embodiments, may be controlled by a series of one or more small motors, hydraulic systems, or other suitable mechanisms, which could be automated to respond to changes in the trailer's speed (or other characteristics such as user input), as described in the previous embodiments.

Inflatable Aerodynamic Enhancement Apparatus

Figure 8:
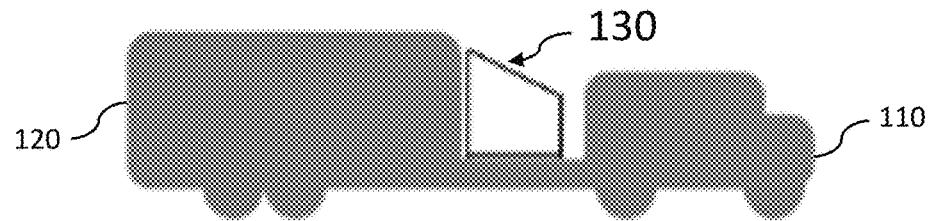
Figure 8:
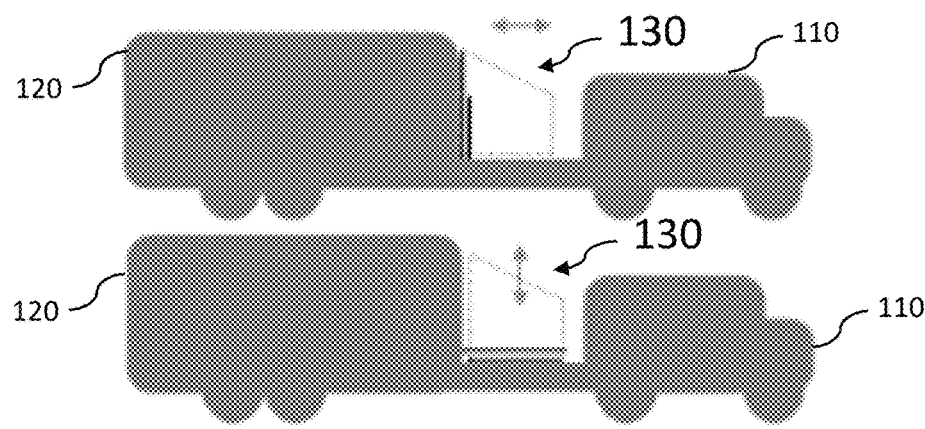

In some embodiments, the aerodynamic enhancement apparatus 130 may have a structure that enables the aerodynamic enhancement apparatus 130 to expand and/or collapse in an inflatable manner, as generally illustrated in FIG. 8. In these instances, the aerodynamic enhancement apparatus 130 may consist of one or more inflatable sections that can deflate to a compact size when the apparatus is in the contracted state, and inflate to form a larger, more aerodynamic shape when in the extended state. It shall be noted that these embodiments may be advantageous for numerous reasons including allowing for a more compact contracted state and a diverse range of shapes in the extended state, potentially improving aerodynamic performance.

In some embodiments, the one or more inflatable sections may be made from a lightweight, durable material, such as reinforced rubber or a high-strength fabric, thus allowing these sections to maintain their shape under high wind pressures while still being light enough to not significantly add to the weight of the trailer 120. The inflation and deflation mechanism, in some instances, may be controlled by a built-in air pump or the like, which may be automated to respond to changes in the trailer's speed (or other characteristics such as user input) as described in the previous embodiments.

Additional Movement Directions of the Aerodynamic Enhancement Apparatus

Figure 9:
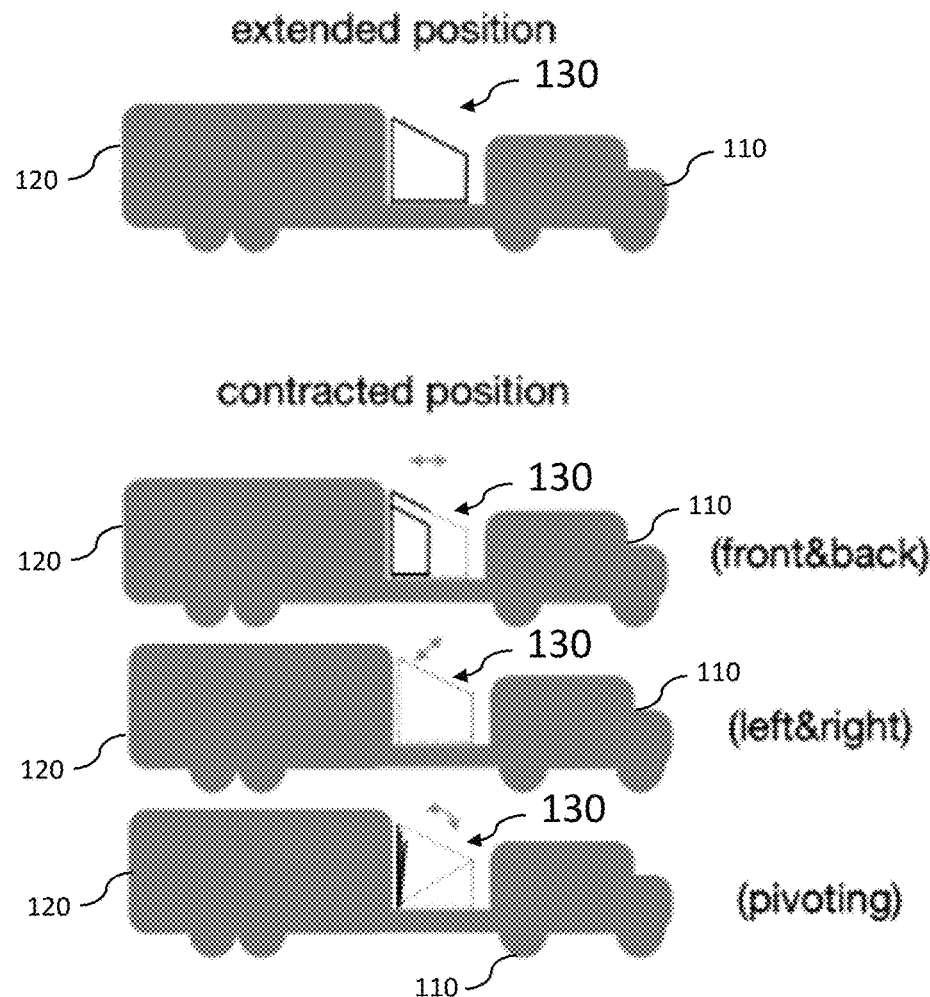

In some embodiments, the aerodynamic enhancement apparatus 130 may be configured to move in a variety of directions to optimize aerodynamic performance and adapt to different towing conditions, as generally illustrated in FIG. 9. These movement directions may include, but should be limited to, vertical movement, rotational movement, diagonal movement, radial movement, circular movement, dynamic pivoting movement, refined front-to-back movement, refined left-to-right movement, or any other suitable movement direction.

In some embodiments, such vertical movement may allow the aerodynamic enhancement apparatus 130 to adjust its height relative to the ground or a mounting surface, potentially adapting to different height characteristics of the tow vehicle 110 and/or the trailer 120. In some embodiments, such rotational movement may enable the aerodynamic enhancement apparatus 130 to rotate about its own axis, allowing it to adjust its orientation relative to the trailer 120. This may be particularly beneficial in situations where the trailer is making a turn, allowing the aerodynamic enhancement apparatus 130 to rotate to maintain its alignment with the airflow and reduce wind resistance.

In some embodiments, such diagonal movement may allow the aerodynamic enhancement apparatus 130 to move in a combination of horizontal and vertical directions, enabling such apparatus to adapt to complex towing conditions or maneuvers. In some embodiments, such radial or circular movement may enable the aerodynamic enhancement apparatus 130 to move in a circular path around a central point, potentially allowing it to adapt to changes in the direction of travel or wind conditions.

In some embodiments, such refined front to back movement may allow the aerodynamic enhancement apparatus 130 to adjust its position along the length of the trailer 120. In such embodiments, the aerodynamic enhancement apparatus 130 could move towards the front of the trailer 120 or towards the back of the tow vehicle 110. Conversely, in some embodiments, such left to right movement may enable the aerodynamic enhancement apparatus 130 to adjust its position across the width of the trailer 120.

In some embodiments, such pivoting movement may allow the aerodynamic enhancement apparatus 130 to rotate about a vertical axis. This may be particularly beneficial when the trailer is making a turn, where the aerodynamic enhancement apparatus 130 could pivot to maintain its alignment with the airflow and reduce wind resistance.

It shall be noted that these various movement directions may be controlled by a combination of motors, hydraulic systems, pneumatic systems, or other suitable mechanisms, and could be automated to respond to changes in the trailer's speed, direction of travel, wind conditions, or other relevant factors (e.g., user input).

Technical Improvements and Benefits

To illustrate the technical improvement and benefits of the aerodynamic enhancement apparatus 130, multiple Computational Fluid Dynamics (CFD) simulations were conducted to analyze the aerodynamics of a towing system with and without the aerodynamic enhancement apparatus 130. Specifically, as shown in FIG. 2, the CFD simulations revealed that without the aerodynamic enhancement apparatus 130, a turbulent air region 202 formed between the tow vehicle 110 and the trailer 120 because of a spatial gap that exists between the tow vehicle 110 and the trailer 120. In particular, in the example of FIG. 2, the turbulent air region 202 includes a low-pressure area in the front half of the spatial gap that pulls the tow vehicle 110 back and a high-pressure area in the back half of the spatial gap that pulls the trailer 120 back. These opposing pressure areas work against both the tow vehicle 110 and the trailer 120, creating significant aerodynamic drag.

Furthermore, FIG. 2 also illustrates CFD simulations of a towing system with the aerodynamic enhancement apparatus 130. These CFD simulations reveal that with the aerodynamic enhancement apparatus 130, a 15-20% improvement in aerodynamic drag reduction is achieved. Specifically, with the aerodynamic enhancement apparatus 130, the high-pressure areas and the low-pressure areas observed in CFD simulations without the aerodynamic enhancement apparatus 130 are reduced, eliminated, or mitigated. Accordingly, the above CFD simulation results illustrate the effectiveness of reducing aerodynamic challenges posed by the spatial gap between the tow vehicle 110 and the trailer 120.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. An expandable aerodynamic enhancement apparatus comprising:
    a support structure that couples to a tongue of a trailer in a position between a tow vehicle and a body of the trailer;
    an extendible housing that couples to the support structure and extendibly moves to a plurality of aerodynamic states including an extended state and a contracted state, wherein the extendible housing encapsulates a majority of the support structure in the contracted state; and
    an actuatable component coupled to the extendible housing that, when actuated, moves the extendible housing into one of the plurality of aerodynamic states.

2. The expandable aerodynamic enhancement apparatus according to claim 1 further comprising:
    a control unit in operable communication with the actuatable component, wherein the control unit is configured to actuate the actuatable component to move the extendible housing to: (1) the extended state when one or more criteria are satisfied, and (2) the contracted state when the one or more criteria are not satisfied.

3. The expandable aerodynamic enhancement apparatus according to claim 2, wherein:
    the expandable aerodynamic enhancement apparatus is in operable communication with a sensor configured to measure a driving characteristic of the trailer,
    the actuatable component moves the extendible housing to the extended state when the driving characteristic satisfies the one or more criteria, and
    the actuatable component moves the extendible housing to the contracted state when the driving characteristic does not satisfy the one or more criteria.

4. The expandable aerodynamic enhancement apparatus according to claim 1, wherein:
    the position between the tow vehicle and the body of the trailer corresponds to a space between a rear portion of the tow vehicle and a front portion of the trailer that is a source of aerodynamic drag,
    the extendible housing, in the extended state, extends into at least a portion of the space and reduces the aerodynamic drag, and
    the extendible housing, in the contracted state, retracts to reveal a portion of the trailer obscured by the extendible housing in the extended state.

5. The expandable aerodynamic enhancement apparatus according to claim 1, wherein:
    the expandable aerodynamic enhancement apparatus includes a front portion and a back portion opposite the front portion,
    the front portion is spaced away from a rear of the tow vehicle, and
    the back portion is spaced away from the body of the trailer.

6. The expandable aerodynamic enhancement apparatus according to claim 1, wherein moving, via the actuatable component, the extendible housing to the contracted state includes lowering the extendible housing over the support structure to minimize a total space or volume that the expandable aerodynamic enhancement apparatus occupies.

7. The expandable aerodynamic enhancement apparatus according to claim 1, wherein:
    during towing, a turbulent air region forms between the tow vehicle and the body of the trailer, and
    moving, via the actuatable component, the extendible housing to the extended state includes raising the extendible housing to physically occupy space within the turbulent air region.

8. The expandable aerodynamic enhancement apparatus according to claim 7, wherein raising the extendible housing to the extended state pseudo-extends a total length of an upper portion of the body of the trailer by at least a minimum length of the extendible housing.

9. The expandable aerodynamic enhancement apparatus according to claim 7, wherein raising the extendible housing includes substantially aligning a top surface contour of the expandable aerodynamic enhancement apparatus to be complimentary with a top surface contour of the body of the trailer.

10. The expandable aerodynamic enhancement apparatus according to claim 9, wherein the top surface contour of the expandable aerodynamic enhancement apparatus artificially extends the top surface contour of the body of the trailer into the turbulent air region.

11. The expandable aerodynamic enhancement apparatus according to claim 1, wherein:

a control unit in operable communication with the actuatable component is configured to receive user input signals specifying a target aerodynamic state for the extendible housing, and based on receiving the user input signals, the control unit actuates the actuatable component to move the extendible housing into the target aerodynamic state.

12. The expandable aerodynamic enhancement apparatus according to claim 1, wherein encapsulating the majority of the support structure in includes enclosing each distinct side of the support structure.

13. The expandable aerodynamic enhancement apparatus according to claim 1, wherein the actuatable component is configured to respond to physical actuation input from a user.

14. The expandable aerodynamic enhancement apparatus according to claim 1, wherein a total height of the expandable aerodynamic enhancement apparatus in the extended state does not exceed a minimum height of the trailer.

15. The expandable aerodynamic enhancement apparatus according to claim 1, wherein an interior of the support structure forms one or more storage compartments integrally connected to one or more interior surfaces of the support structure.

16. An expandable aerodynamic enhancement apparatus comprising:
- a support structure that couples to a tongue of a trailer in a position between a tow vehicle and a body of the trailer, wherein the position between the tow vehicle and the body of the trailer corresponds to a space between a rear portion of the tow vehicle and a front portion of the trailer that is a source of aerodynamic drag;
- an extendible housing that couples to the support structure; and
- a drive assembly coupled to the extendible housing that, when actuated, moves the extendible housing into one of a plurality of aerodynamic states including an extended state that extends the extendible housing into at least a portion of the space to reduce the aerodynamic drag and a contracted state that retracts the extendible housing to reveal a portion of the trailer obscured by the extendible housing in the extended state.

17. The expandable aerodynamic enhancement apparatus according to claim 16, further comprising:
- a control unit in operable communication with the drive assembly, wherein the control unit is configured to actuate the drive assembly for moving the extendible housing to: (1) the extended state when one or more driving criteria are satisfied, and (2) the contracted state when the one or more driving criteria are not satisfied.

18. The expandable aerodynamic enhancement apparatus according to claim 16, wherein a total height of the expandable aerodynamic enhancement apparatus in the extended state does not exceed a minimum height of the trailer.

19. An expandable aerodynamic enhancement apparatus comprising:
- a support structure that couples to a tongue of a trailer in a position between a tow vehicle and a body of the trailer, wherein a turbulent air region forms between the tow vehicle and the body of the trailer during towing;
- an extendible housing that couples to the support structure and extendibly moves to a plurality of aerodynamic states including an extended state and a contracted state; and
- an actuatable component coupled to the extendible housing that, when actuated, moves the extendible housing into one of the plurality of aerodynamic states, wherein moving, via the actuatable component, the extendible housing to the extended state includes raising the extendible housing to physically occupy space within the turbulent air region.

* * * * *